UNITED STATES PATENT OFFICE 2,626,951

STABILIZATION OF GLYCERIDE OILS WITH STARCH PHOSPHATES

John C. Cowan, Peoria, and Cyril D. Evans, Peoria Heights, Ill., assignors to the United States of America as represented by the Secretary of Agriculture No Drawing. Application July 21, 1950, Serial No. 175,281

8 Claims. (Cl. 260—398.5)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the treatment of glyceride oils and such related materials as synthetically produced esters of long chain fatty acids, and edible compositions comprising fats of animal or vegetable origin. It particularly relates to the treatment of such fatty substances to prevent oxidative deterioration and to increase the storage life and utility of such fatty substances as food materials.

Glyceride oils or animal or vegetable origin are known to deteriorate more or less rapidly upon storage and to develop off-flavors and odors which reduce their utility and value as food materials or as ingredients in pharmaceutical or cosmetic compositions. This deterioration is mainly due to oxidative processes which are extremely difficult to control. Difficulty of control is largely due to the presence of small quantities of metals in the oil which act as catalysts for the autooxidation of the oil.

This invention has among its objects the treatment of glyceride oils which contain small quantities of metallic constituents of the class which possesses oxidative catalytic properties, and to remove such metals or to neutralize their catalytic effect, thus increasing the oxidative stability of the oil.

We have discovered that glyceride oils, treated with starch phosphates, possess improved flavor stability under normal storage conditions. Starch phosphates possess the chemical property of combining with metal ions usually present in glyceride oils. This phenomenon results in a chemical complex between the starch phosphates and such metals as iron, copper, nickel, cobalt and the like, of such a nature that the metals no longer act as catalysts.

Utilizing our discovery we improve greatly the oxidative stability and the flavor stability of glyceride oils, particularly vegetable oils, such as soybean oil, cottonseed oil, peanut oil, mustard seed oil, corn oil, and the like by adding thereto stabilizing amounts of starch phosphates. The effect of starch phosphates is pronounced upon the oil either in the raw state, as refined by conventional procedure, or in the presence of added metals, such as iron or copper.

Glyceride oils vary in natural stability, and also vary considerably in their content of heavy metal impurities. In the case of commercially refined edible oils of different origins, the iron content for example may vary as much as one hundred fold, ranging from 0.03 up to almost 5.0 parts per million. The copper content varies as much as ten fold.

Starch phosphates as used in this invention may be prepared in accordance with the process of Lohmar U. S. Patent No. 2,575,352, Nov. 20, 1951, and should contain at least 2 percent by weight of phosphorous. Said Lohmar application describes the preparation of water-insoluble phosphorylated starches, which are resistant to swelling in hot water, from corn starch, hot-rolled gelatinized starch, potato starch, corn starch, pyrodextrin, commercial "soluble starch," and tapioca starch by distilling the starch with pyridine at about 50° C. to 115° C., followed by reacting with phosphorous oxychloride in dry pyridine at 40° to 115° C. According to our in-

*Table I*

| Oil | Control | | | 0.01% Starch phosphates | | | 0.1% Starch phosphates | 0.01% Citric acid |
|---|---|---|---|---|---|---|---|---|
| | A. O. M. | Flavor score | | A. O. M. | Flavor score | | A. O. M. | A. O. M. |
| | | At 0 time | Stored 6 da. at 60° C. | | At 0 time | Stored 6 da. at 60° C. | | |
| Oil No. 1, cottonseed | 39.5 | | | 15.5 | | | | |
| Oil No. 2, cottonseed | 43.6 | | | 21.1 | | | | |
| Oil No. 3, soybean | 40.7 | | | 3.2 | | | 30.2 | |
| Oil No. 3+0.3 p. p. m. Fe | 61.4 | | | 6.3 | | | | |
| Oil No. 4, soybean | 12.9 | 8.8 | 5.9 | 2.5 | 8.9 | 6.2 | | |
| Oil No. 4+0.1 p. p. m. Fe | 16.9 | 8.3 | 5.9 | 2.8 | 8.8 | 6.3 | | |
| Oil No. 5, soybean | 69.2 | | | 32.6 | | | | |
| Oil No. 6, soybean | 29.9 | | | | | | 18.6 | 47.4 |
| Oil No. 6+0.1 p. p. m. Cu | | | | 7.0 | | | 3.0 | |
| Oil No. 6+0.01 p. p. m. Cu | | | | 2.5 | | | | | vention it is added to the oil in an amount ranging from 0.001 to 0.1 percent by weight. The addition of the phosphate is relatively simple, since it is readily dispersible in the oil, and the addition may be effected at any desired stage in the conventional treatment of the oil. If a large amount is used, a cloudiness of the resulting oil is occasionally encountered due to the fine suspension of starch phosphates in the oil. This cloudiness is not deleterious in any way but may be eliminated, if desired, by filtration, and the stabilizing effect of the starch phosphates, after such filtration, is retained by the oil. This may be due to either or both of two factors, namely, the stabilizing effect of residual starch phosphate remaining in the oil after filtration, and physical removal of the deleterious metal ions complexed and removed with the starch phosphate by filtration.

The following experimental data illustrates the invention.

Samples of soybean oil and cottonseed were treated with starch phosphate in the amounts shown in Table I. The phosphorous content of the starch phosphate was approximately 10 percent. Additional control samples containing no starch phosphate were also subjected to the tests. As a further basis of comparison, one sample of oil containing 0.01 percent citric acid was prepared and tested. Oil samples containing added catalytically active metals were also evaluated, both with and without starch phosphate. An additional sample, not shown in the table, was tested containing a low phosphorous (0.4 percent P) starch phosphate. Its effect, although showing improvement, was inferior to that of phophates containing a greater percentage of phosphorous.

A chemical evaluation, known as the modified Swift stability test was made, which provides the peroxide values after the samples are blown with air for 8 hours at 208° F. (A. O. M. values). The oils were also evaluated organoleptically. The tasting panel was composed of persons skilled in taste testing, and the flavor scores given in the table are based on a 1 to 10 scoring system in which the highest score is 10.

While starch phosphates having a phosphorous content of at least 2 percent are markedly or far superior to those of lower phosphorous content, the latter are within the broader scope of the invention. The starch phosphorylating agent, phosphorous oxychloride, is an orthophosphoric acid acylating agent.

We claim:

1. A new composition of matter, a glyceride oil and a stabilizing amount of starch phosphate.

2. Process of stabilizing a glyceride oil against oxidative deterioration which comprises incorporating from 0.001 to 0.1 percent by weight starch phosphate.

3. A new composition of matter, a glyceride oil and a stabilizing amount of starch phosphate, said phosphate containing at least 2 percent phosphorous.

4. A new composition of matter as described in claim 3 in which the glyceride oil is of vegetable origin and the starch phosphate is present within the range of 0.001 to 0.1 percent based on the weight of the oil.

5. A stabilized soybean oil containing from 0.001 to 0.1 percent starch phosphate, said phosphate containing at least 2 percent phosphorous.

6. A stabilized cottonseed oil containing from 0.001 to 0.1 percent starch phosphate, said phosphate containing at least 2 percent phosphorous.

7. Process of stabilizing a glyceride oil of vegetable origin against oxidative deterioration which comprises incorporating from 0.001 to 0.1 percent by weight starch phosphate, said phosphate containing at least 2 percent phosphorous.

8. The process of stabilizing a glyceride vegetable oil comprising incorporating a minor amount of a starch phosphate prepared by treating starch with pyridine at 50 to 115° C. and thereafter reacting with phosphorous oxychloride.

JOHN C. COWAN.
CYRIL D. EVANS.

REFERENCES CITED

The following references are of record in the file of this patent:

UNITED STATES PATENTS

| Number | Name | Date |
| --- | --- | --- |
| 2,128,926 | Epstein | Sept. 6, 1938 |
| 2,128,946 | Katzman | Sept. 6, 1938 |
| 2,252,479 | Beyer | Aug. 12, 1941 |